A. G. ALBRECHT.
WHEEL PULLER.
APPLICATION FILED OCT. 16, 1919.
1,354,271. Patented Sept. 28, 1920.
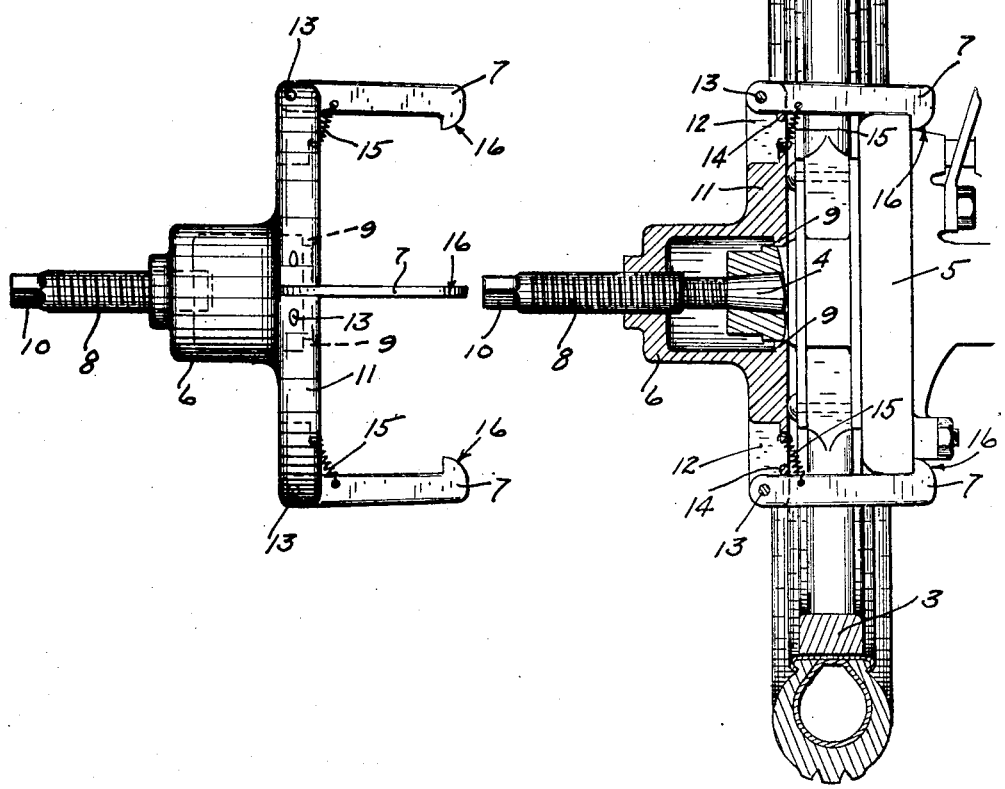
INVENTOR
Armin G. Albrecht
BY HIS ATTORNEYS

UNITED STATES PATENT OFFICE.

ARMIN G. ALBRECHT, OF ST. PAUL, MINNESOTA.

WHEEL-PULLER.

1,354,271.   Specification of Letters Patent.   Patented Sept. 28, 1920.

Application filed October 16, 1919. Serial No. 331,046.

*To all whom it may concern:*

Be it known that I, ARMIN G. ALBRECHT, a citizen of the United States, residing at St. Paul, in the county of Ramsey and State of Minnesota, have invented certain new and useful Improvements in Wheel-Pullers; and I do hereby declare the following to be a full, clear, and exact description of the invention, such as will enable others skilled in the art to which it appertains to make and use the same.

My invention has for its object to provide an extremely simple and highly efficient wheel puller that can be very quickly and easily applied in working position and removed therefrom.

To the above end, the invention consists of the novel devices and combinations of devices hereinafter described and defined in the claims.

In the accompanying drawings, which illustrate the invention, like characters indicate like parts throughout the several views.

Referring to the drawings:—

Figure 1 is a side elevation of the improved wheel puller; and

Fig. 2 is a view partly in elevation and partly in central section showing the invention applied in position to remove an automobile wheel from its axle.

The improved wheel puller, as shown in Fig. 2, is applied to one of the rear wheels 3 of an automobile, and the numerals 4 and 5 indicate, respectively, the axle and brake drum of said wheel. Said wheel puller includes a cap 6, brake drum-engaging grapple hooks 7, and an axle-engaging screw 8 axially located in respect to said cap and having screw-threaded engagement with the bossed top thereof.

An internal flange 9 is integrally formed with the open end of the cap 6 for engagement with the hub of the wheel 3 to center the cap thereon, with the screw 8 in axial alinement with the axle 4, and also to support the cap from said hub. The outer end of the screw 8 is made square in cross section at 10 for the application of a wrench by which said screw may be rotated.

A large radially extended annular flange 11 is integrally formed with the cap 6, at the open end thereof, and has in its periphery a plurality of radial notches 12 to receive one of the ends of the grapple hooks 7. Pivot pins 13 connect the grapple hooks 7 to the flange 11 for radial swinging movement toward and from the longitudinal axis of the cap 6.

Stop pins 14 secured in the flange 11 extend through the notches 12 in the paths of movement of the grapple hooks 7 and limit their inward swinging movement. A coiled spring 15 is anchored to each grapple hook 7 and the flange 11 and yieldingly hold said grapple hooks against the stop pins 14 and substantially parallel to the projected axis of the screw 8. The grapple hooks 7 are arranged to enter between certain of the spokes of the wheel 3 and radially spaced to extend outward of the brake drum 5 and interlock with the inner edge portion thereof, as shown in Fig. 2.

In applying the improved wheel puller in working position, the operator may grasp the cap 6 in one hand and apply the same over the hub of the wheel 3 and at the same time direct the grapple hooks 7 between the spokes of said wheel. During the application of a wheel puller to a wheel, the internal flange 9 engages the hub of the wheel 3 and centers the cap 6 thereon. As the grapple hooks 7 are inserted between the spokes of the wheel 3 the free ends thereof, which are curved or beveled at 16, engage the brake drum 5 and cam said grapple hooks outward against the tension of the springs 15. A continued inward movement of the cap 6 will cause the grapple hooks 7 to pass over the brake drum 5 and allow the springs 15 to automatically interlock the same with the inner edge portion of said brake drum and thereby secure the wheel puller in working position. Obviously, the engagement of the flange 9 with the hub of the wheel 3 affords a support for the wheel puller directly on said hub.

With the grapple hooks 7 interlocked with the brake drum 5, the cap 6 is securely anchored to the wheel 3 and affords a base of resistance for the screw 8. By turning the screw 8 in a direction to cause the same to move inward by means of a wrench or other tool, the inner end thereof will impinge against the outer end of the axle 4 and a continued inward movement of said screw will exert a force to pull the wheel 3 from said axle.

What I claim is:—

1. A wheel puller comprising a cap having a wheel hub-engaging surface, a plurality of circumferentially spaced grapple hooks pivoted to the cap, springs under strain to swing the grapple hooks radially inward, and a screw having screw-threaded engagement with the cap.

2. A wheel puller comprising a cap having a wheel hub-engaging surface, a plurality of circumferentially spaced grapple hooks pivoted to the cap, springs under strain to swing the grapple hooks radially inward, a screw having screw-threaded engagement with the cap, and stops limiting the inward swinging movement of the grapple hooks.

3. A wheel puller comprising a cap having an internal hub-engaging flange, a plurality of circumferentially spaced grapple hooks pivoted to the cap, springs under strain to swing the grapple hooks radially inward, and a screw having screw-threaded engagement with the cap.

4. A wheel puller comprising a cap having a wheel-engaging face and an internal hub-engaging flange, a plurality of circumferentially spaced brake drum-engaging grapple hooks pivoted to the cap, springs under strain to swing the grapple hooks radially inward, and an axle-engaging screw having screw-threaded engagement with the cap.

In testimony whereof I affix my signature in presence of two witnesses.

ARMIN G. ALBRECHT.

Witnesses:
CLARA DEMAREST,
HARRY D. KILGORE.